March 12, 1935.  E. A. SPERRY, JR  1,993,864
FLIGHT INDICATOR FOR AIRCRAFT
Filed Feb. 24, 1932   2 Sheets-Sheet 1
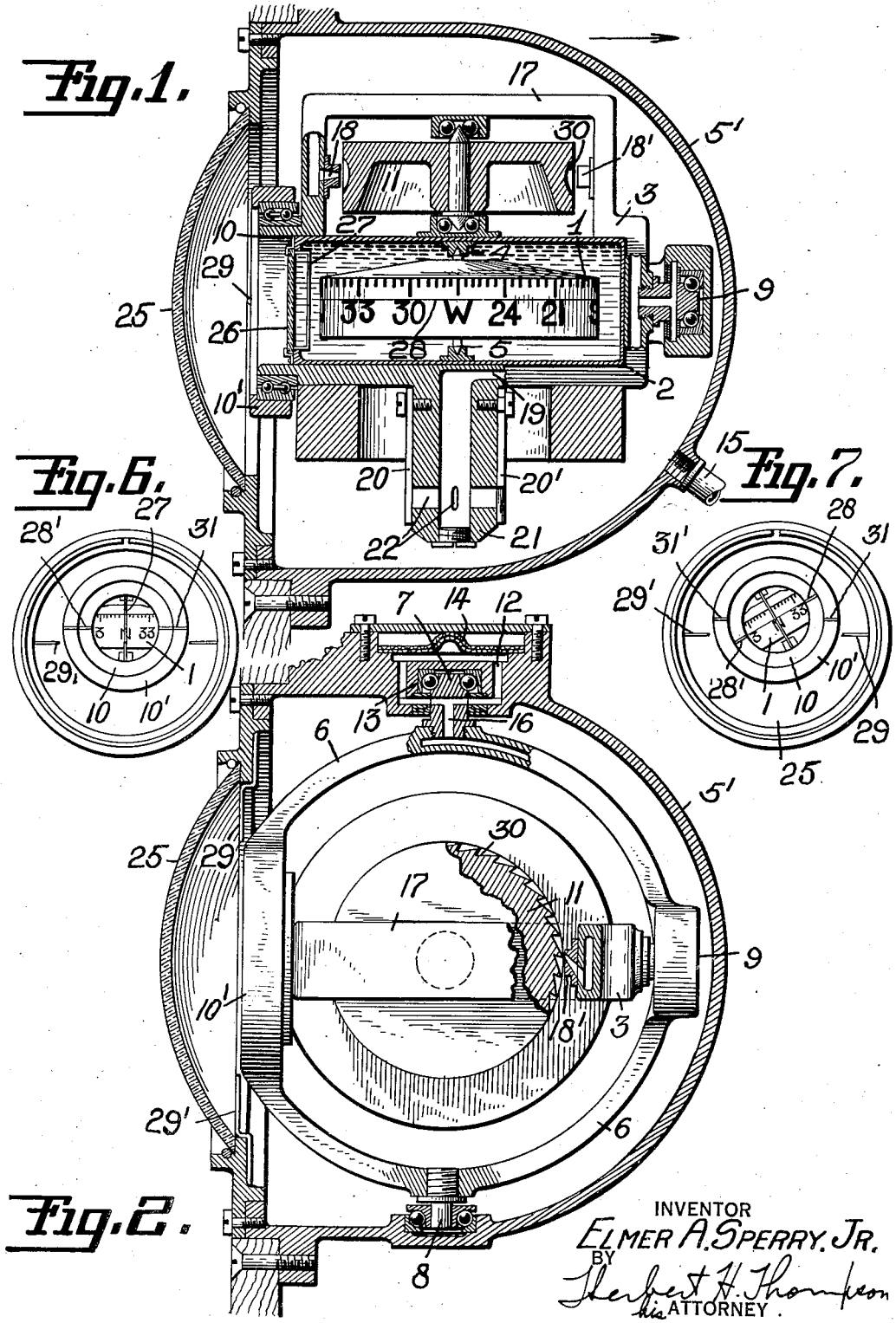
INVENTOR
ELMER A. SPERRY, JR.
BY
his ATTORNEY.

March 12, 1935. E. A. SPERRY, JR 1,993,864
FLIGHT INDICATOR FOR AIRCRAFT
Filed Feb. 24, 1932   2 Sheets-Sheet 2
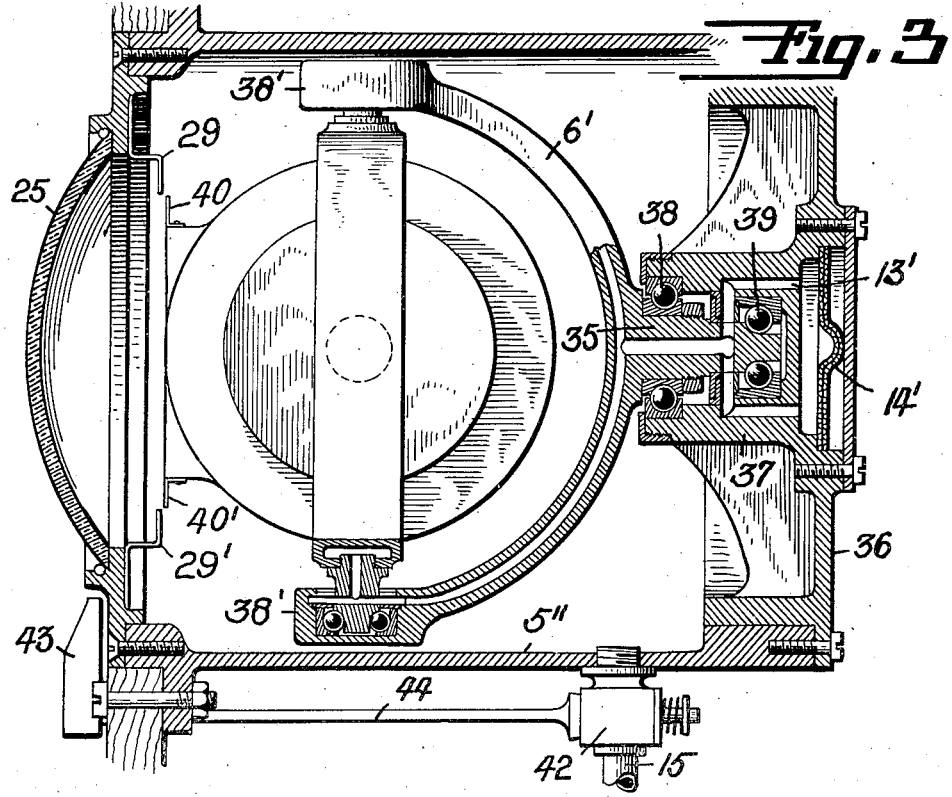
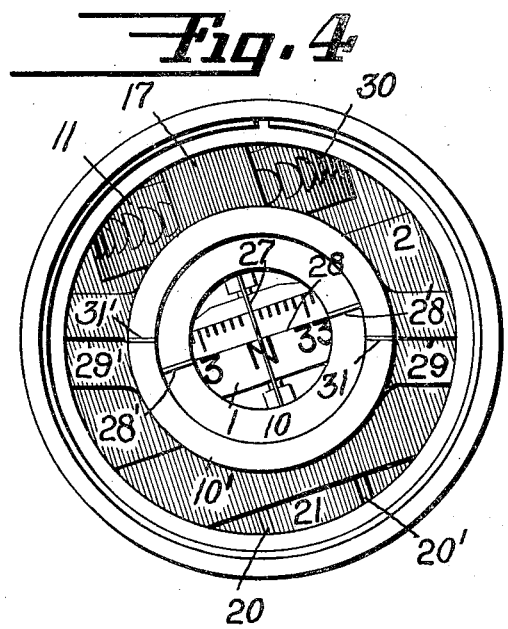
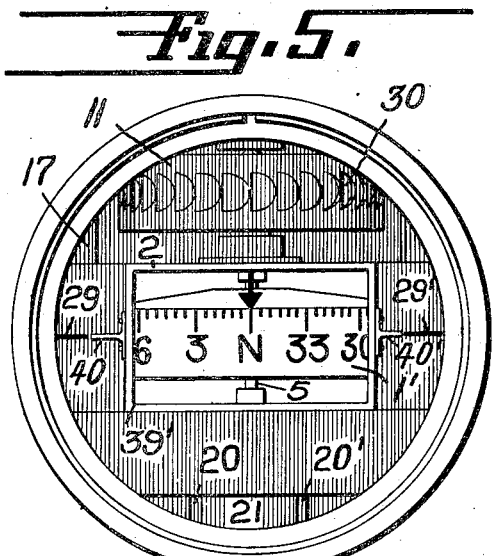
INVENTOR
ELMER A. SPERRY, JR.
BY Herbert H. Thompson
his ATTORNEY.

Patented Mar. 12, 1935

1,993,864

UNITED STATES PATENT OFFICE 1,993,864

FLIGHT INDICATOR FOR AIRCRAFT

Elmer A. Sperry, Jr., Brooklyn, N. Y., assignor to Sperry Gyroscope Company, Inc., Brooklyn, N. Y., a corporation of New York Application February 24, 1932, Serial No. 594,776

6 Claims. (Cl. 33—222)

This invention relates to flight indicators for aircraft. More particularly it relates to magnetic compasses especially designed for aircraft in which acceleration pressures, due to turning, ascent and descent and changes of speed are much more marked than on water craft. As is well known, the earth's magnetic field does not lie in a horizontal plane but at a substantial angle thereto. However, a magnetic compass is designed to be responsive only to the horizontal component and the usual practice is to mount the compass card or needle universally on a pivot and to balance the same against the downward pull of the earth's field on the north end of the needle by putting a weight on the south end. Such an unbalanced weight, however, gives the compass card a pendulous factor which is subject to acceleration forces. When an airplane turns rapidly, therefore, it is quite usual for the compass card to start spinning or to be seriously disturbed so that it is impossible to use the card until some time after the airplane has settled down on a new course.

One of the principal objects of my present invention is to design a magnetic compass which has no pendulous factor and which, therefore, will remain substantially undisturbed during maneuvers of the ship. To accomplish my invention I mount the magnetic compass on pivots for movements in azimuth, only, in or on a gyro vertical which will maintain a horizontal plane unaffected by acceleration forces or the slight pull of the vertical component of the earth's magnetism on the card. In carrying out my invention I also have developed a flight indicator which shows on the one face or dial not only the fore and aft and lateral trim of the airship but also the direction in azimuth.

Other objects of the invention will become apparent from the following description.

Referring to the drawings, showing several preferred forms of the invention,

Fig. 1 is a vertical section of my improved magnetic compass indicator.

Fig. 2 is a horizontal section through the casing of the same, a portion of the device also being shown in section.

Fig. 3 is a vertical section of a modified form of the invention.

Fig. 4 is a face view of the form of the invention shown in Figs. 1 and 2, the parts being shown as they would appear to the aviator with the plane banked.

Fig. 5 is a face view of the form of the invention shown in Fig. 3 with the parts in their normal position.

Fig. 6 is a face view on a smaller scale similar to Fig. 4 but showing the appearance of the instrument on pitching of the aircraft.

Fig. 7 is the same view, when the aircraft is both pitched and banked.

According to my invention I mount the magnetic compass element shown as the usual compass card 1 within a casing 2, forming a part of or mounted on a universally supported gyro vertical 3. Preferably the card is supported on upper and lower spaced pivots 4 and 5 within the casing so that the card, while free to turn in azimuth, is rigidly held against tilting movements in any other plane with respect to the stabilized casing. The instrument as a whole is universally mounted within an outer supporting frame or casing 5'. For this purpose there is shown a gimbal ring 6 pivotally supported in outer trunnions 7 and 8 in the frame 5' and supporting in turn on inner trunnions 9 and 10 the framework 17 of the instrument 3.

Preferably the gyroscope is air spun and in order to lead in the air supply to the gyro rotor 11 without placing a torque on the gyroscope the trunnion 7 is made hollow and communicates with passageways 12 in the bearing 13. Said passageways communicate with the outer air through a screen 14. In order to drive the gyroscope, the air is withdrawn from the sealed casing 5' through the pipe 15 to create a partial vacuum within the casing 5', thus drawing in air through the screen 14 and into the passageways 16 through the trunnion 7. Said passageways communicate with the interior of the hollow gimbal 6, leading air to the hollow trunnion 9 from where it passes into a framework 17 which is also made hollow to lead the air to the driving jets 18—18' adjacent the rotor, the latter being provided with buckets or blades 30 around the periphery thereof. Air is also led through the passageway 19 to the erecting device at the bottom of the instrument. This may be in the form of a plurality of small pendulous plates 20—20' pivotally mounted on a downwardly projecting hollow extension 21 of the gyro frame and normally partially covering laterally extending apertures 22 near the bottom thereof. The instrument as a whole is substantially balanced about its horizontal axes of support, so as to be unaffected by acceleration pressures, the instrument being maintained vertical by the action of the erecting device as explained in the copending application Serial No. 514,737 filed February 10, 1931 of Bert G. Carlson.

In order that the compass card may be seen from the front of the instrument as mounted on the instrument board, and also in order that the device may be also employed as an indicator of the vertical, i. e. as an artificial horizon, I have shown the forward trunnion 10 as of large diameter and made hollow so that the casing 2 of the compass card is visible through the front window 25 of the outer casing 5'. The inner casing 2 is also provided with a glass window 26 through which the card is read on an index or lubber line 27. I also place either on the compass card as at 28 or on the outer portion of the trunnion 10 as at 28' horizontal reference lines which are stabilized by being mounted on the gyro vertical both about the fore and aft axis and the lateral axis of the airplane.

In Figs. 1 and 2 the instrument is presumed to be mounted on the instrument board with the front window 25 facing the operator so that the craft will be headed in the direction of the arrow. Upon lateral inclination of the craft, therefore, the instrument would appear to the aviator as shown in Fig. 4, the horizontal reference lines 28 apparently tilting with respect to the cooperating index lines 29—29' on the face of the instrument, the lines 31, 31' on the outer bearing 10' for the trunnion 10 remaining in line with lines 29—29'. In case the airplane tilted forward, however, the lines 28, 28' and 31, 31' would appear to remain horizontal but would move up with respect to the lines 29, 29', as shown in Fig. 6. In case of both pitch and bank occurring simultaneously, the face of the instrument would appear as in Fig. 7, showing how my improved device separates this combined angular motion into its factors and gives a distinctive indication of which prior gyro verticals have not been capable. At all times, however, the azimuth reading of the compass card would remain undisturbed because the actual horizontal position of the card is undisturbed.

Figs. 3 and 5 illustrate a modified form of mounting for my instrument by which the visibility of the compass card and other markings are improved. According to this form, the necessity for making hollow one of the trunnions 10 of the first described form of instrument is obviated. In this case the outer gimbal ring 6' is pivoted on a long trunnion 35 at the rear of the instrument, no corresponding forward trunnion being employed. To this end, the rear plate 36 of the casing 5" is provided with a forwardly extending hollow boss 37 in which is mounted a pair of spaced ball bearings 38, 39, the trunnion 35 being journaled in said bearings. As before, air is admitted through the screen 14' which passes through passageway 13' in the boss 37 and thence through the hollow trunnion 35 into the passageway through the hollow gimbal 6'. Air may be withdrawn from the casing 5" as before through pipe 15. The speed of the gyroscope may be regulated by a valve 42 controlled from a thumb-piece 43 on the instrument board through valve stem 44. Gimbal 6' supports the instrument proper on horizontal trunnions 38', 38' at right angles to trunnion 35.

The forward portion of the casing is provided with a rectangular opening 39' through which the compass card 1' is visible from the front of the instrument through the window 25. Reference lines 29, 29' may be provided as before adjacent the window and readable on horizontal indices 40, 40' on the casing of the instrument.

It will readily be seen, therefore, that this form of the instrument, as well as the form shown in Figs. 1, 2 and 4, will show not only compass bearings but also the fore and aft and lateral trim of the airship. If the ship tips downwardly, the reference marks 29, 29' will move down with respect to the indices 40, 40', while if the ship tips laterally, the reference marks will become relatively inclined somewhat as indicated in Fig. 4 or in the opposite direction thereto dependent on the direction of bank.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flight indicator for aircraft, an outer gimbal ring pivoted athwartships on the craft, and a gyro and magnetic compass casing pivoted fore and aft in said gimbal, one of said last-named pivots being hollow and through which said compass is visible.

2. In a flight indicator for aircraft, an outer gimbal ring pivoted athwartships on the craft, a gyro and magnetic compass casing pivoted fore and aft in said gimbal, one of said last-named pivots being hollow and through which said compass is visible, and index marks on both the gimbal ring and casing trunnion also visible through said pivot to show both pitch and bank of the craft.

3. In a flight indicator for aircraft, an outer gimbal ring pivoted athwartships on the craft, a gyro casing pivoted fore and aft in said gimbal on trunnions, the end of one of said trunnions being visible through the bearing in the gimbal, and reference indices of horizontality on both said trunnion and the surrounding bearing whereby pitching, banking and combined pitching and banking may be readily distinguished.

4. In a flight indicator for aircraft, an outer casing, a gyroscope, means for universally mounting said gyroscope therein including an outer gimbal pivotally mounted in said casing in a single bearing at the rear, said gyroscope being pivotally mounted in said gimbal athwartships, a magnetic compass pivotally mounted on said gyroscope, and a front window in said casing through which said compass is visible.

5. In a flight indicator for aircraft, an outer casing, a gyroscope, means for universally mounting said gyroscope therein including an outer gimbal pivotally mounted in said casing in a single bearing at the rear, said gyroscope being pivotally mounted in said gimbal athwartships, a magnetic compass card of the vertical or side reading type pivotally mounted in said gyroscope, a front window in said casing through which said card is visible, and indices adjacent thereto on said casing for showing the attitude of the craft in all planes when read in connection with said card.

6. In a flight instrument for aircraft, a gyro vertical, means mounting said gyro for spinning about a vertical axis and for movement about two mutually perpendicular horizontal axes, said two axes being substantially coplanar, a magnetic compass card of the annular or side reading type and located substantially in the plane of said axes, a pivotal mounting for said card in said gyro vertical anchoring said card to said gyro vertical in all planes except in azimuth, a substantially vertical window through which said card is visible from the front, and indices adjacent said card for showing the attitude of the craft in all planes.

ELMER A. SPERRY, Jr.